United States Patent Office 3,538,713
Patented Nov. 10, 1970

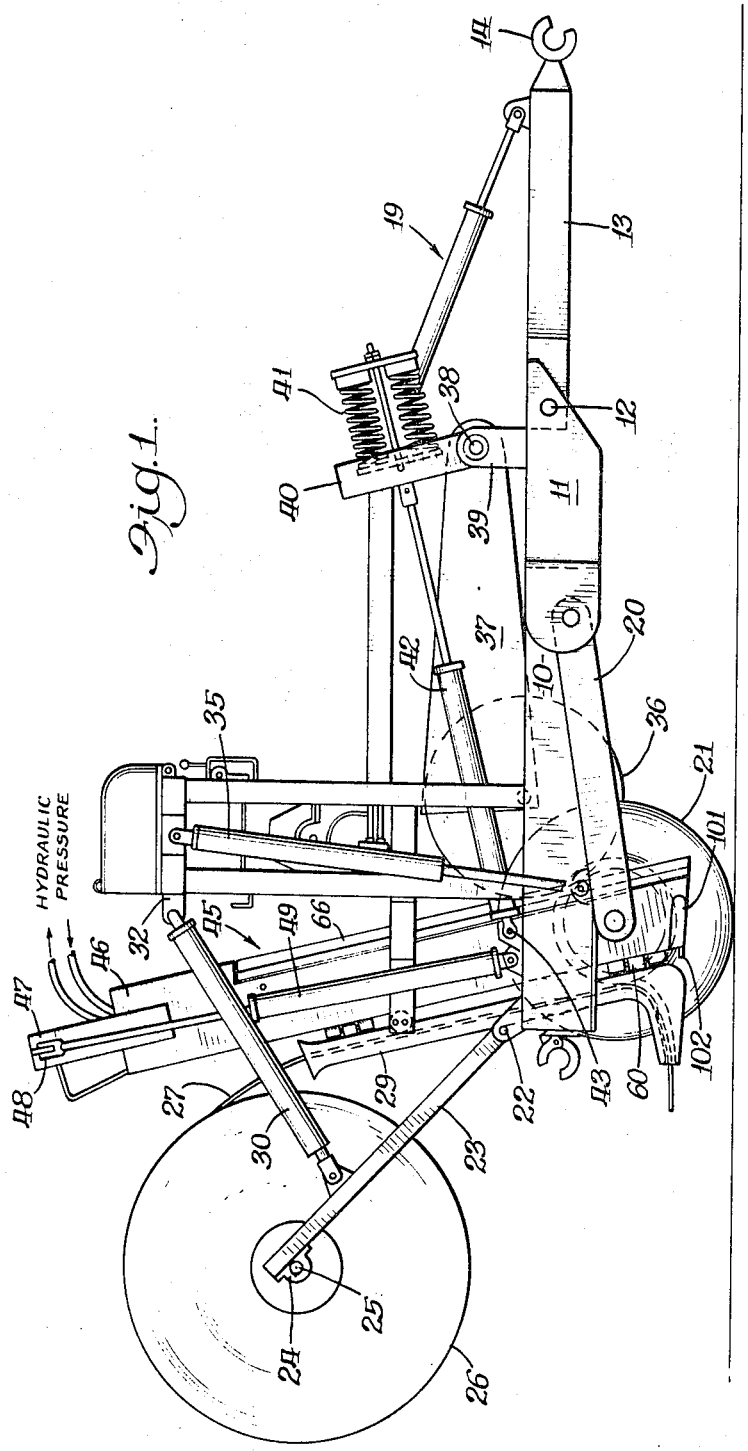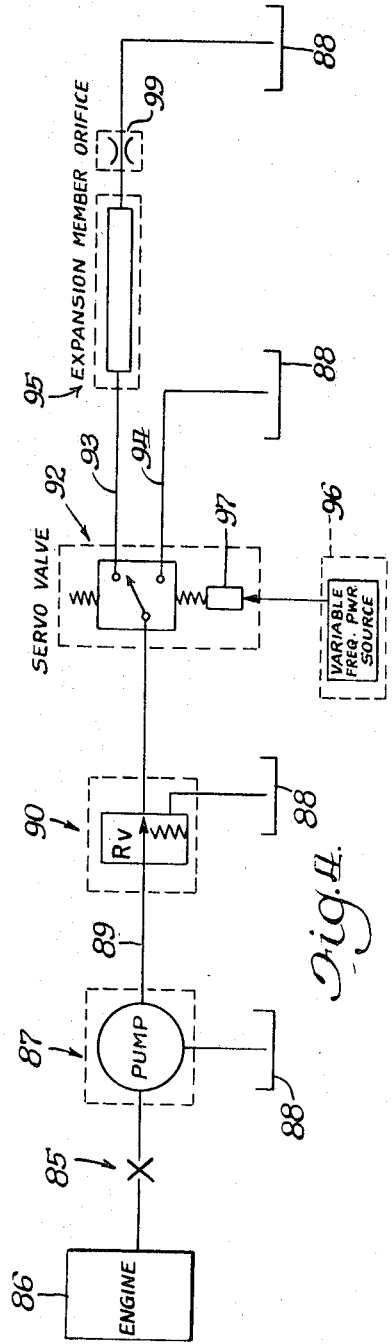

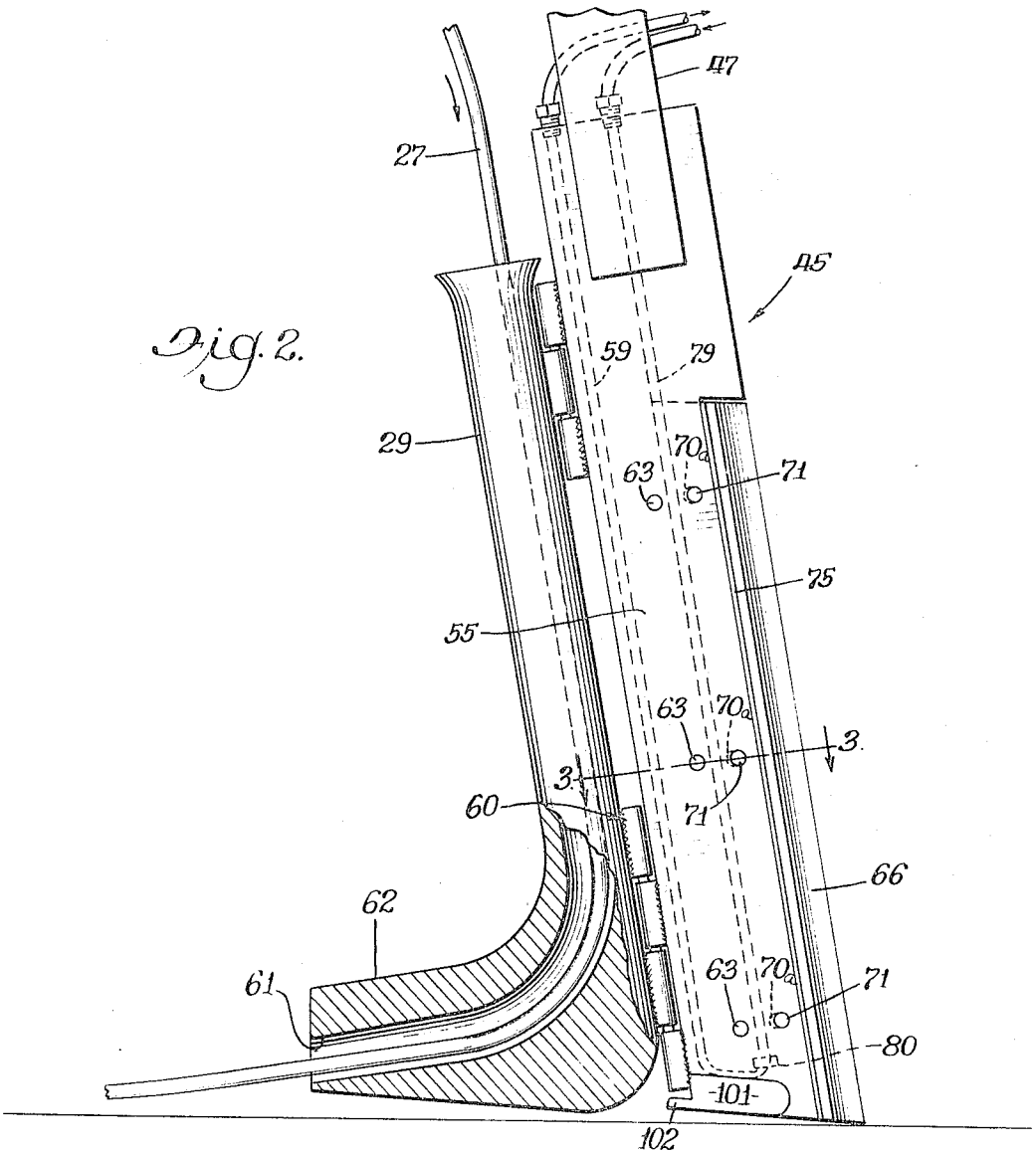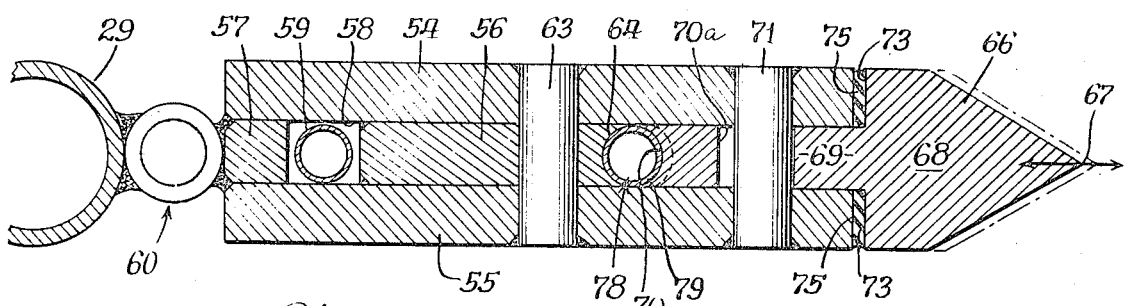

3,538,713
HIGH-IMPACT PLOW WITH RECIPROCATING CUTTING BLADE
Donald J. Killoren, Appleton, Wis., assignor to Ken-Tel Equipment Company, a corporation of Delaware
Filed Sept. 12, 1968, Ser. No. 759,378
Int. Cl. F16l *1/00;* A01b *17/00*
U.S. Cl. 61—72.6                  9 Claims

ABSTRACT OF THE DISCLOSURE

A plow is mounted on a wheeled frame and adapted to be pulled through the ground to cut a slit of predetermined depth. The plow includes an elongated tooth or shank having an upright slot at its forward edge and an enclosed channel or void behind the upright slot. A cutting blade is slidably received in the forward slot of the tooth for reciprocating action in a generally horizontal direction. The walls of the forward slot of the plow tooth and the rear surface of the cutting blade cooperate to define an expansion chamber which receives a sealed, flexible conduit filled with pressurized fluid. A return conduit for the fluid is received in the rear channel of the plow. As the plow is pulled through the ground, the fluid pressure is pulsated at a predetermined repetition rate under high pressure, thus expanding the flexible conduit to engage the rear surface of the cutting blade and causing it to punch forward in a chopping motion when the pressure is abruptly increased. As the pressure in the flexible conduit subsides, the pulling of the plow causes the expansion chamber to constrict; and the next pressure pulse causes another forward punching of the blade.

BACKGROUND

The present invention relates to a plow which is adapted to be selectively lowered into the ground to cut a slit of predetermined width and depth, as for burying flexible cable or for pulling straight, rigid pipe along the bottom of the slit.

Devices or machines of the type with which the present invention is concerned conventionally have a generally upright plow shank mounted on a frame and carried by the frame to be embedded at a predetermined depth beneath the surface of the ground. Such plows are usually attached behind a traction vehicle by which they are pulled through the ground. It has been found that if the plow tooth or shank alone is used to form the slit, a great deal of power is required to pull it. In order to cut down the power requirements for pulling the plow at the deeper depths, some devices provide a coulter in front of the plow tooth and forcibly held in engagement with the ground to cut an initial slit having a width and depth less than the desired depth for the cable laying. Although this arrangement cuts down somewhat on the power required for forming the slits, it does not significantly reduce this power.

Other approaches to reducing the amount of power required include providing a vertically-reciprocating knife edge in front of the plow shank and adapted to oscillate back and forth in a vertical direction to cut an initial slit with a slicing action. Although this arrangement is somewhat better than the coulter type devices, again, it does not substantially reduce the overall power requirements; and it has the further disadvantage that in its upward travel, it carries with it soil which is then deposited to either side of the slit thus leaving side furrows after the cable has been laid. This loose surface dirt must then be swept back into the slit.

Devices have been suggested on which the plow shank is oscillated in a fore-and-aft direction by rotating the entire shank about an axis transverse of the direction of travel of the machine. This, however, is impractical because the large mass of the shank causes excessive vibration of the entire machine. Further, the substantial surface area of the buried portion of the shank which is in engagement with the soil increases frictional resistance to such swinging action of the entire plow tooth.

SUMMARY

The present invention provides a cutting blade which is slidably mounted in the forward edge of an elongated plow tooth and adapted to pulsate in a direction which is generally perpendicular to the axis of the plow tooth, the lower end of which is preferably slightly forwardly inclined. As the cutting blade is pulsed forward, the soil engaged thereby is separated by the forward edge of compacted sideways by a chopping, pulsating motion of the reciprocating blade as the blade penetrates. Thus, the cutting blade of the present invention does not carry dirt to the surface while forming the initial plow slit.

The walls of the slot in the plow tooth which receives the blade together with the rear surface of the reciprocating blade define a generally circular channel or expansion chamber extending longitudinally of the plow tooth for receiving an expansion tube containing pressurized fluid. A return channel receiving a non-expandable conduit is formed behind the expansion chamber for returning the pressurized fluid to the system. Means are carried on the plow frame for pulsating the fluid in the expansion tube which thereupon engages the rear surface of the leading edge to cause it to abruptly push forwardly. As the plow is pulled along the ground and the pressure in the expandable conduit subsides, the expansion chamber will constrict and the leading edge will move slightly rearwardly relative to the plow tooth. The next impulse of fluid pressure will again cause the leading edge to punch ahead of the plow shank in a chopping action to further penetrate the soil.

This punching or chopping action by means of a horizontally-reciprocable leading edge received in a plow shank has been found to substantially reduce the power requirement for forming vertical slits in the ground with a minimum of vibration experienced in the frame and above-earth portion of the machine. The particular mechanism for pulsating the leading edge of the plow has been found to be reliable and effective.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a side elevation view of a complete cable-laying apparatus incorporating a specific embodiment of the present invention;

FIG. 2 is an enlarged detail drawing, partially cut away, of the plow assembly;

FIG. 3 is a horizontal cross section view of the plow assembly of FIG. 2 taken along the sight line 3—3 thereof; and FIG. 4 is a functional schematic diagram of the control system for pulsating the cutting blade of the plow.

DETAILED DESCRIPTION

For purposes of illustrating the inventive concept, the illustrated embodiment is set in the context of a plow for burying flexible cable. However, persons acquainted with the art may readily adapt the principle to other tools, devices or machines wherein it is desired to penetrate, cut, compact or otherwise operate in soil.

Turning first to FIG. 1, an apparatus is shown for laying or burying flexible cable which incorporates a preferred embodiment of the present invention. As seen therein, a main horizontal frame member (which is preferably in the form of a boat as seen from above) is designated 10; and it includes a prow portion 11, the forward end of which pivotally receives (as at 12) a folding tongue member 13. A forward hitch 14 is affixed to the front end of the tongue 13. A hydraulic cylinder and piston rod unit generally designated 19 pivotally interconnects the forward end of the tongue 13 with a vertical extension of the frame 10 (not seen) so that the tongue 13 may be controlled thereby for angle towing thereby permitting the plow unit to conform to the elevations and depressions in the ground when pulled by the traction vehicle in operation.

Each side of the frame 10 is provided with a wheel arm 20, the distal end of which rotatably receives a supporting wheel 21 secured in a conventional bearing mount.

Pivotally mounted at 22 to the rear of the main frame 10 is a pipe 23, the distal end of which is provided with a bearing assembly 24 for supporting a cable reel axle assembly 25 on which is rotatably mounted in a cable reel 26; the cable is identified by reference numeral 27 and unreeled from the spool and fed downward into a shoe 29. It will be understood that there are a pair of the pipe supports 23, one at either side; and each are held in elevation by means of a cylinder and piston rod unit 30, interconnecting an intermediate portion of the pipe 23 with a rigid vertical extension 32 of the main frame 10.

Another hydraulic cylinder and piston rod unit 35 is interconnected between the vertical subframe 32 and an intermediate position of the wheel arm 20 for positioning the same; again, it will be realized that each of the wheels is provided with a similar arrangement, but that the present inventive concept is not limited to this arrangement.

Intermediate the lateral portions of the main frame 10 there is provided a coulter blade 36 rotatably journaled to and housed within a box frame 37 which, in turn, is pivotally mounted by means of a shaft 38 to a vertical extension 39 of the boat 11. A member 40 is mounted to the shaft 38 and provided with a spring assembly 41 for resiliently urging the coulter blade 36 into engagement with the ground about the shaft 38 when it is in a cutting position. A hydraulic cylinder and piston rod unit 42 connected between the frame 10 at 43 and the spring unit 41 is provided for selectively lowering and raising the coulter blade 37. The coulter assembly is, of course, entirely optional with the invention.

Mounted for vertical movement between the wheels 20 is the inventive plow assembly generally designated by reference numeral 45. Referring now to FIGS. 1–3, the plow assembly includes an elongated tooth or shank 46 to the top of which is mounted a bracket 47. At the top of the bracket and at each side are pivotally mounted at 48, hydraulic cylinder and piston rod units 49 for selectively raising and lowering the plow assembly 45 and tooth 46. Referring now to FIGS. 2 and 3, the plow tooth is fabricated from first and second side plates 54 and 55 separated by means of a central core plate 56 and a rear core plate 57 which are welded in place. The separation between the rear surface of the central core plate 56 and the rear core plate 57 is shown at 58; and it defines a vertical void or channel for receiving a return conduit 59 filled with pressurized fluid, as explained in further detail within.

At the rear of the plow tooth, the cable shoe 29 is hinged by means of the conventional hinge coupling generally designated by reference numeral 60 to follow behind the plow tooth while feeding the cable through a channel 61 extending downwardly along the vertical portion of the shoe 29 and thence rearwardly along the curved extension 62 of the plow shoe 29.

A first set of tie pins 63 extend through the side plates 54 and 55 and the center core plate 56 for rigidly fastening the assembly together. The forward surface of the central core plate 56 defines a concave surface 64 extending substantially the length of the plow tooth; thus, the forward portions of the side plates 54 and 55 as well as the concave forward surface 64 of the core plate 56 define a slot for receiving a cutting blade 66. As seen in FIG. 3 wherein is shown a transverse cross section of the cutting blade, the cutting surface which engages the soil is wedge-shaped to define a leading vertical cutting edge 67 at the forward end of a head portion 68. As the cutting blade is pulsed forward, the edge 67 separates the soil along a vertical line and the angularly-inclined surfaces of the head 68 of the blade compact the separate sections, forcing them sideways.

A rearwardly-extending rib member 69 defining a rear concave surface 70 fits into the previously-mentioned forward slot of the plow tooth. The rib member 69 defines three transverse slots 70a which are elongated in a generally horizontal direction (but slightly upwardly inclined as shown) for receiving corresponding tie pins 71 which hold the forward ends of the side plates 54 and 55 together while permitting horizontal reciprocation of the cutting blade 66. The head 68 of the cutting blade 66 defines two rear shoulders 73 extending laterally of the rib 69. These surfaces are sealed to the forward surfaces of the side plates 54 and 55 with resilient material such as neoprene or rubber as at 75. The flexible sealing material 75 also acts as a shock absorber during reciprocation of the cutting blade 66 as described presently. The concave surface 64 of the core plate 56 and the concave surface 70 of the extension member 69 of the cutting blade 66 cooperates to define a cylindrical expansion chamber 78 which receives an expandable conduit 79 filled with pressurized fluid and communicating by means of a connector 80 (FIG. 2) with the lower portion of the return conduit 59.

As seen in dashed line in FIG. 2, the flexible conduit member 79 extends lengthwise of the moveable blade; and the return conduit 59, which is again schematically designated by dashed line in FIG. 2, extends substantially the entire length of the tooth, the two communicating near the bottom of the tooth. In a preferred embodiment, the flexible conduit 79 is a high pressure hydraulic hose including a nylon extruded tube core with woven nylon reinforcing and an outer sheath of abrasive-resistant plastic. The actual expansion need not exceed $\frac{1}{16}$ in. to $\frac{1}{8}$ in. in actual use; but the total force exerted by the expanding surface of the tube is very high. For example, with a pressure of 1500 pounds per square inch, a tube or hose length of four feet, an outside diameter of $\frac{1}{16}$ in., the exerted force is 184,000 pounds.

This force of 184,000 pounds is applied to the reciprocating cutting blade 66 of the plow tooth. Since normal plowing forces seldom exceed 100,000 pounds, and are usually substantially less, the leading edge can be advanced through the soil by hydraulic pressure. Ground reaction compresses the expansion member during the low pressure portion of the hydraulic impulse cycle. This forces oil out of the expansion member thus decreasing the volume of the expansion chamber. The next impulse expands the tube as the cycle repeats.

Turning now to FIG. 4, one method of achieving the pulsating of the hydraulic fluid is shown in schematic form including a mechanical coupling 85 from a gas engine 86 to the input shaft by a hydraulic pump generally designated 87. The pump 87 receives the hydraulic fluid from a reservoir 88. The pump 87 converts mechanical energy from the engine 86 to fluid power in a hydraulic feed line 89. A relief valve 90 is interposed in the feed line 89 to relieve excessive pressures in this line back to the reservoir 88 should the pressure exceed a predetermined safe value. An electrohydraulic servo valve 92 receives the fluid output of the relief valve 90; and it switches the input pressurized liquid between one of two output lines designated respectively 93 and 94. The output line 94 feeds back to the reservoir 88 and the output line 93 feeds directly to the expansion member 95.

A variable frequency power source 96 generates a periodic output signal which is fed to the electrohydraulic servo valve 92 including a solenoid 97 which switches the input line alternately between the output lines 93 and 94. The repetition rate of the output signal from the variable frequency power supply 96 is selectively variable to permit adjustment of the repetition rate to obtain the optimum pulsation for a given set of soil conditions. For example, variation of pulse repetition rates up to 3,000 pulses per minute have been found satisfactory; but higher rates are possible. As the hydrauic fluid enters the expansion member 95, as already explained, it causes it to expand to thereby exert a force on the reciprocating cutting blade to impart a forward thrust to it. A restrictive orifice 99 is interposed between the output of the expansion member 95 and the system reservoir 88 to restrict the return of fluid from the expansion member to the system reservoir while permitting the build-up of pressure therein when pressurized fluid is forced into the output line 93 by the servo valve 92.

The inventive arrangement thus provides a reciprocating cutting blade for a plow tooth which minimizes the total mass of equipment in motion, it being limited only to the reciprocating leading edge. As described above, the relatively greater inertia of the plow tooth, its rigid mounting on the frame, as well as the frictional forces holding it within the soil all contribute to the transmitting of most of the expansion force directly to the cutting blade. Current so-called "vibration" approaches presently in use involving a violent shaking action to a tooth inherently impart tremendous vibrational forces to the entire piece of equipment during operation. According to the present invention, there is no reaction until the forward pressure of the plow (or in the case of other soil and ground engaging tools the application of a tool to the work at hand) places pressure on the operating mechanism. The tougher the penetration problem becomes, the more work the system puts out. The pulsation rate may be independently set according to operating conditions. Currently available vibratory plows are not designed or constructed to be able to withstand the physical punishment of brute-force plowing methods. This is primarily due to the requirement that bearings and pivotal mountings be a part of the vibrating system. With the present invention, the pulsating leading edge becomes an integral part of ruggedly-designed and constructed equipment which does not exhibit such weaknesses as bearing points and pivotal mounts. The principal advantages of the rigidly-mounted plow and rugged construction to withstand tremendous pull are preserved and enhanced. The rugged pulsating edge is not affected by forces as great as most current equipment is designed to withstand.

Although this embodiment has been described as suited for burying flexible cable, it will be appreciated that a tunneling mandrel or mole 101 (FIG. 2) located at the head of the plow shank permits the pulling of rigid pipe. In this case an eyelet 102 behind the mole 101 serves as the location to which the pipe is anchored. Finally, as seen in the drawing, the tooth and cuting blade are preferably slightly inclined with the bottom of the blade in a forward position. Thus, the blade is forced outwardly at a perpendicular to the axis of the tooth in a generally (although not precisely) horizontal direction.

Having thus described in detail a preferred embodiment of the present invention, it will be apparent to persons skilled in the art that certain modifications may be made and equivalent elements substituted in the combination while continuing to practice the principle of the invention; and it is, therefore, intended that all such modifications and substitutions be covered as they are embraced within the spirit and scope of the appended claims.

I claim:

1. In combination with a frame supported by ground-engaging wheels, a plow assembly comprising an elongated tooth mounted on said frame in a generally upright direction and adapted to be pulled through the ground to cut a slit of predetermined depth; a cutting blade slidably mounted to the lead edge of said tooth for generally horizontal reciprocation relative to said tooth, said blade extending in a generally upright direction when in cutting position; power means interposed between said tooth and said blade for abruptly forcing said blade forward of said tooth when energized; and means for cyclically energizing said power means to engage said blade and force said blade forward in a generally horizontal direction away from said tooth to separate the soil in front of it in a chopping action.

2. The combination of claim 1 wherein said power means comprises fluid-filled expandable means, and said energizing means includes means for periodically pressurizing said fluid in said expandable means; and wherein said tooth defines an upright forward slot and said leading cutting blade includes a wedge-shaped cutting head and a rearwardly-extending rib member integral with said cutting head and received in said slot, said rib defining a generally concave rear surface engaged by said expandable means when energized, the wall of said tooth facing said concave surface of said rib defining a concave surface whereby the major portion of the expansion force drives said cutting blade forwardly.

3. The combination of claim 2 wherein said opposing concave surfaces of said rib and said tooth cooperate to define an expansion cylinder, and wherein said expandable means comprises an expandable tube in said expansion cylinder for engaging both said concave surfaces when expanded with pressurized fluid.

4. The combination of claim 3 wherein said plow blade is adapted on said plow frame for horizontal movement to cut a slit of predetermined depth.

5. The combination of claim 4 wherein said plow tooth further defines a channel behind said expansion cylinder, said combination further comprising a return conduit in said channel communicating with said expandable hose for returning said fluid to said pressure means.

6. The combination of claim 5 wherein said pressure means includes means for presetting the repetition rate of the fluid pulses.

7. The combination of claim 1 further comprising a shoe defining a slot for receiving a flexible cable pivotally received behind said plow tooth for burying said flexible cable at the bottom of said slit.

8. In a plow blade adapted for cutting a slit in soil, the improvement comprising a plow shank; a cutter blade mounted on said shank for reciprocation in the direction of cutting; an expandable, flexible hose engaging both said shank and said blade to cause the same to separate when expanded and to retract when said blade encounters ground reaction tracted; and power means for cyclically pressurizing said hose to expand the same, whereby the cyclic expansion of said hose will cause said blade to pulsate against soil and cut through the same in a chopping motion without carrying dirt to the surface.

9. The combination of claim 8 further comprising means for pulling said plow steadily through said ground whereby upon expansion of said member, said forward cutting blade will move forwardly and upon subsiding of said pressure in said flexible member, said expansion chamber will contract thereby moving said cutting blade relatively closer to said plow shank.

References Cited

UNITED STATES PATENTS

| 2,970,392 | 2/1961 | Perkins et al. | 172—40 |
| 3,326,009 | 6/1967 | Gagne | 61—72.6 |
| 3,363,423 | 1/1968 | Davis | 61—72.6 |

JACOB SHAPIRO, Primary Examiner

U.S. Cl. X.R.

172—40